(12) United States Patent
Dent et al.

(10) Patent No.: US 6,330,292 B1
(45) Date of Patent: Dec. 11, 2001

(54) REDUCED POWER MATCHED FILTER

(75) Inventors: Paul Dent, Pittsboro, NC (US); Kenzo Urabe, Miyagi (JP)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/197,597

(22) Filed: Nov. 23, 1998

Related U.S. Application Data

(63) Continuation-in-part of application No. 08/967,444, filed on Nov. 11, 1997, now Pat. No. 5,931,893.

(51) Int. Cl.$^7$ .................................................. H04L 27/30
(52) U.S. Cl. ........................ 375/343; 375/150; 375/152; 375/142; 375/143; 708/315; 708/422
(58) Field of Search ..................................... 375/343, 150, 375/152, 142, 143; 708/315, 422

(56) References Cited

U.S. PATENT DOCUMENTS

| | | | |
|---|---|---|---|
| 4,862,402 | 8/1989 | Shah et al. | 708/315 |
| 5,684,727 | 11/1997 | Campbell et al. | |
| 5,715,276 * | 2/1998 | Tran et al. | 375/207 |
| 5,872,815 | 2/1999 | Strolle et al. | |
| 5,931,893 * | 7/1999 | Dent et al. | 708/422 |
| 5,960,033 * | 9/1999 | Shibano et al. | 375/207 |
| 6,005,899 * | 12/1999 | Khayrallah | 375/343 |
| 6,075,807 * | 6/2000 | Warren et al. | 375/143 |

FOREIGN PATENT DOCUMENTS

| | | |
|---|---|---|
| 0391587 | 10/1990 | (EP) . |
| 2095067 | 9/1982 | (GB) . |
| WO 96/26578 | 8/1996 | (WO) . |
| WO 9626578 | 8/1996 | (WO) . |
| WO 96/11445 | 11/1996 | (WO) . |
| WO 97/36395 | 10/1997 | (WO) . |

OTHER PUBLICATIONS

Gilhousen et al., "On the Capacity of a Cellular CDMA System", *IEEE Transactions on Vehicular Technology*, vol. 40, No. 2, May 1991, pp. 303–312

* cited by examiner

*Primary Examiner*—Young T. Tse
*Assistant Examiner*—Paul N Rupert
(74) *Attorney, Agent, or Firm*—Coats & Bennett, P.L.L.C.

(57) ABSTRACT

A matched filter for use in a radio telephone receiver that receives Code Division Multiple Access (CDMA) signals. The matched filter produces precombinations of input values to significantly reduce the number of multiplication and addition operations, compared to conventional matched filters, required to produce a correlation value. This reduced number of required operations, along with a reduced number of delay elements required to despread CDMA signals, significantly reduces the overall power consumption of the matched filter. The use of such a matched filter in a device like a cellular phone, for example, would thus lead to longer battery life.

18 Claims, 12 Drawing Sheets

FIG. 3

REDUCED POWER MATCHED FILTER

CROSS-REFERENCE TO RELATED APPLICATION

This application is a continuation in part of U.S. application Ser. No. 08/967,444, now U.S. Pat. No. 5,931,893, entitled "Efficient Correlation Over A Sliding Window", filed Nov. 11, 1997, which is incorporated herein by reference.

BACKGROUND

This invention relates generally to receivers in radio telephone communication systems, and more particularly to radio receivers that receive Code Division Multiple Access (CDMA) signals.

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCNs) employing low cost, pocket-size, cordless telephones that can be carried comfortably and used to make or receive calls in the home, office, street, car, etc. would be provided by cellular carriers using the next generation of digital cellular system infrastructure and cellular frequencies. The key feature demanded of these new systems is increased traffic capacity.

Currently, channel access is achieved using Frequency Division Multiple Access (FDMA), Time Division Multiple Access (TDMA) and Code Division Multiple Access (CDMA) methods. In FDMA systems, a communication channel is a single radio frequency band into which a signal's transmission power is concentrated. Interference with adjacent channels is limited by the use of bandpass filters that only pass signal energy within the filters' specified frequency bands. Thus, with each channel being assigned a different frequency, system capacity is limited by the available frequencies as well as by limitations imposed by channel reuse.

In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate that increases the amount of occupied spectrum proportionally.

With FDMA or TDMA systems or hybrid FDMA/TDMA systems, the goal is to ensure that two potentially interfering signals do not occupy the same frequency at the same time. In contrast, CDMA systems allow signals to overlap in both time and frequency. Thus, all CDMA signals share the same frequency spectrum. In both the frequency and the time domain, the multiple access signals overlap. Various aspects of CDMA communications are described, for example, in "On the Capacity of a Cellular CDMA System," by Gilhousen, Jacobs, Viterbi, Weaver and Wheatley, *IEEE Trans. on Vehicular Technology*, May 1991.

In a typical CDMA system, the informational data stream to be transmitted is impressed upon a much higher bit rate data stream generated by a Pseudo Random Noise code (PNcode) generator. The informational data stream and the high bit rate data stream are typically multiplied together. This combination of higher bit rate signal with the lower bit rate data stream is called coding or spreading the informational data stream signal. Each informational data stream or channel is allocated a unique spreading code. A plurality of coded information signals are transmitted on radio frequency carrier waves and jointly received as a composite signal at a receiver. Each of the coded signals overlaps all of the other coded signals, as well as noise-related signals, in both frequency and time. By correlating the composite signal with one of the unique spreading codes, the corresponding information signal is isolated and decoded.

There are a number of advantages associated with CDMA communication techniques. The capacity limits of CDMA-based cellular systems are projected to be up to twenty times that of existing analog technology as a result of the wideband CDMA system's properties such as improved coding gain/modulation density, voice activity gating, sectorization and reuse of the same spectrum in every cell. CDMA is virtually immune to multi-path interference, and eliminates fading and static to enhance performance in urban areas. CDMA transmission of voice by a high bit rate encoder ensures superior, realistic voice quality. CDMA also provides for variable data rates allowing many different grades of voice quality to be offered. The scrambled signal format of CDMA eliminates cross-talk and makes it very difficult and costly to eavesdrop or track calls, insuring greater privacy for callers and greater immunity from air time fraud. In communication systems following the CDMA or "spread spectrum" concept, the frequency spectrum of an informational data stream is spread using a code uncorrelated with that of the data signals. The codes are also unique to every user. This is the reason why a receiver that has knowledge about the code of the intended transmitter is capable of selecting the desired signal.

There are several different techniques to spread a signal. Two of the most popular are Direct-Sequence (DS) and Frequency-Hopping (FH), both of which are well known in the art. According to the DS technique the data signal is multiplied by an uncorrelated code referred to as a Pseudo Random Noise Code (PNcode). A PNcode is a sequence of chips (bits) valued at −1 and 1 (polar) or 0 and 1 (non-polar) and has noise like properties. One way to create a PNcode is by means of at least one shift register. When the length of such a shift register is N, the period $N_{DS}$ is given by the equation $N_{DS}=2^n-1$.

In a receiver in a CDMA system, the received signal is multiplied again by the same (synchronized) PNcode. Since the code consists of +1's and −1's, this operation removes the code from the signal and the original data signal is left. In other words, the despreading operation is the same as the spreading operation.

FIG. 1 is a block diagram of a conventional correlator, which is used to compute correlations between the last M signal samples received and an M-bit codeword. An M-element delay line 10 stores received signal samples and sequentially shifts them through each of the M stages. Consequently, the delay line memory elements contain the last M signal sample values received. After each new sample is shifted in and one old sample is shifted out, the M sample values are read out of the delay line into M sign-changers 12, where the M sample values are multiplied by +1 or −1 according to the bits b . . . b of a predetermined code with which correlation is to be computed. The sign-changed values are then summed in adder 13 to produce a correlation result.

In general, the process of correlating a 64-element vector A=(a1, a2, . . . a64) with another 64-element vector C=(c1, c2, . . . c64) involves forming the inner product A*C=a1*c1+ a2*c2+ . . . a64*c64. When the elements of one of the vectors (e.g., C) comprises only binary values (arithmetically +1 or −1), the products such as a1*c1 simplify to ±a1, but the process of adding the 64 values±a1± a2± . . . ±a64 is still a significant effort when it has to be performed for every new value of "a" received. In the above example, the vector length (64) is used for illustrative purposes only. One of ordinary skill in the art will realize that any length vector could be used.

The prior art includes many variations of the correlator shown in FIG. 1. For example, signal samples may be single-bit or "hard-limited" quantities of only +1 or −1 instead of multi-bit quantities. The sign-changers used then are typically simple XOR gates. In that case, the adder 13 may first add pairs of single-bit values to obtain M/2 two bit values; M/4 two-bit adders then add two-bit values to obtain M/4 three-bit values, and so on. Such a structure, known as an "adder tree", is simpler when the input values are single-bit rather than multi-bit values.

For single-bit value signal samples, the adder tree can be replaced by an up/down counter that scans the M values, and counts up when a +1 is encountered and down when a −1 is encountered. Likewise, for multi-bit value signal samples, a parallel adder tree can be replaced by a sequential adder that extracts each of the M values, in turn, from the delay line memory and adds it to an accumulator. In the latter case, the logic employed must operate M-times as fast as in the parallel adder case. Consequently, there is a trade-off between the overall speed of the correlator and the logic complexity. Nevertheless, in each of the above-described prior art correlator variations, it is necessary to combine M values anew after each new signal sample is received.

Another depiction of a conventional matched filter or correlator is shown in FIG. 2. The received signal is sampled at a rate Fc samples per second, and the samples are entered sequentially to the inputs of multipliers, denoted by X. The 64 multipliers each have one bit of a PNcode as their second input value, shown as C1, C2, C3 . . . C64 (for a matched filter having length 64), in FIG. 2. In this conventional matched filter, a current input sample a(i) is multiplied by C1 in the leftmost multiplier, and the multiplier output C1·a(i) is fed to a one sample delay element D1. The value will emerge from the delay element D1 at the next sample period when a(i+1) is input to all the multipliers. As the value C1·a(i) emerges from delay element D1 into the first input of a first summer, C2 multiplies input sample a(i+1) to obtain a value C2·a(i+1) and applies this product to the second input of the first summer. The output of the first summer is then C1·a(i)+C2·a(i+1) which enters delay element D2. The value emerges from D2 in the next sample period when a(i+2) is input to the multipliers. The output from D2 is thus added to C3·a(i+2) and the result is input into delay element D4, and so forth. Thus, it may be seen that after 64 samples have been input, the following value emerges from the rightmost summer:

$$C1 \cdot a(i) + C2 \cdot a(i+1) + C3 \cdot a(i+2) + \ldots + C64 \cdot a(i+63)$$

which is a 64-sample correlation between the values C1 . . . C64 and the signal samples a(i) . . . a(i+63).

Upon each successive signal sample being entered, a new 64-point correlation is computed between, successively, the signal samples:

$$a(i+1) \ldots a(i+64)$$

$$a(i+2) \ldots a(i+65)$$

The resulting correlations appear to be a combination of the coefficients C1 . . . C64 with 64 signal samples selected according to a sliding window 64-samples wide. Hence, another term for this matched filter is "sliding correlator".

The device of FIG. 1 performs, at each sample clock period, 64 multiplications and 64 additions. This consumes a large amount of power, particularly when the power supply is a portable supply such as a battery. There is thus a need for a matched filter that minimizes computations to reduce power consumption.

SUMMARY

It is an object of this invention to reduce the number of multiplications and/or additions performed to obtain each successive correlation value. Decreasing the number of multiplications and additions reduces the power consumed from the supply, thus extending the battery life of battery operated equipment using sliding correlators or matched filters, such as Cellular Phones which receive CDMA signals.

According to exemplary embodiments, a matched filter receives at its input a stream of signal samples, with one new sample being received at each successive period of a sample rate clock. For each new sample input, a complete correlation value is output, which value is the correlation between the last N input samples and a PNcode comprising N digital symbols. The correlator computes successive correlations at each new sample clock period in a manner requiring significantly fewer than N multiply and N add operations per correlation value, by forming precombinations of a limited number of successive input samples, the precombinations being independent of the given PNcode.

BRIEF DESCRIPTION OF THE DRAWINGS

Applicant's invention will be understood by reading this description in conjunction with the drawings, in which:

FIG. 3 illustrates an arrangement of overlapping consecutive shifts of a 15-bit code, which can be correlated with received signal samples;

DETAILED DESCRIPTION

Figure 1:
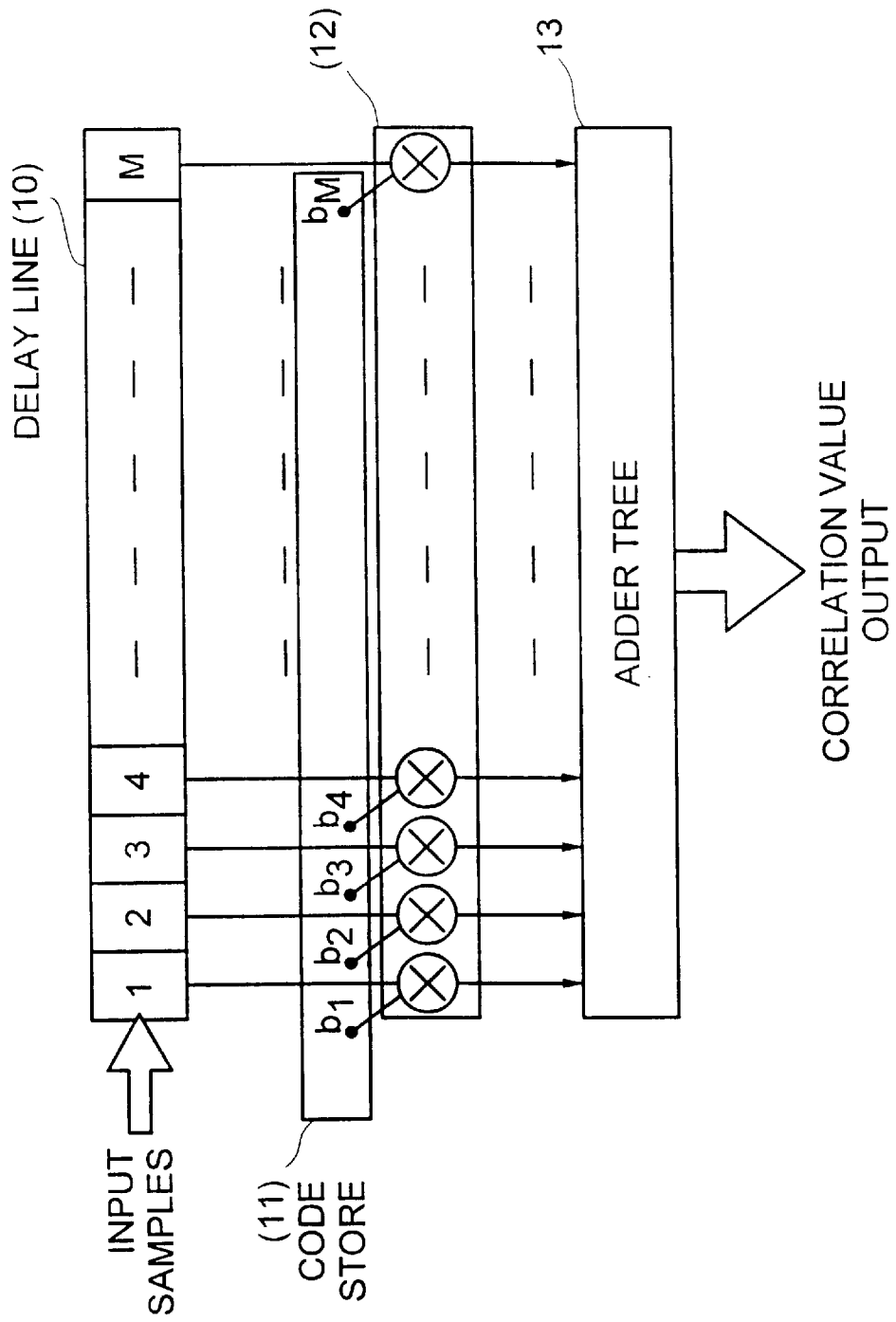
FIG. 1 illustrates a conventional correlator.

According to exemplary embodiments, a matched filter for use in a DS CDMA system receives input sample signals at a sample clock rate and forms precombinations of the input sample signals. The matched filter uses the precombinations, along with a given PNcode, to decode the received input sample signals and produce one correlation value output at the sample clock rate. The matched filter uses less logical operations to produce the same output as conventional matched filters, thus leading to greater power conservation which extends battery life.

Figure 3:
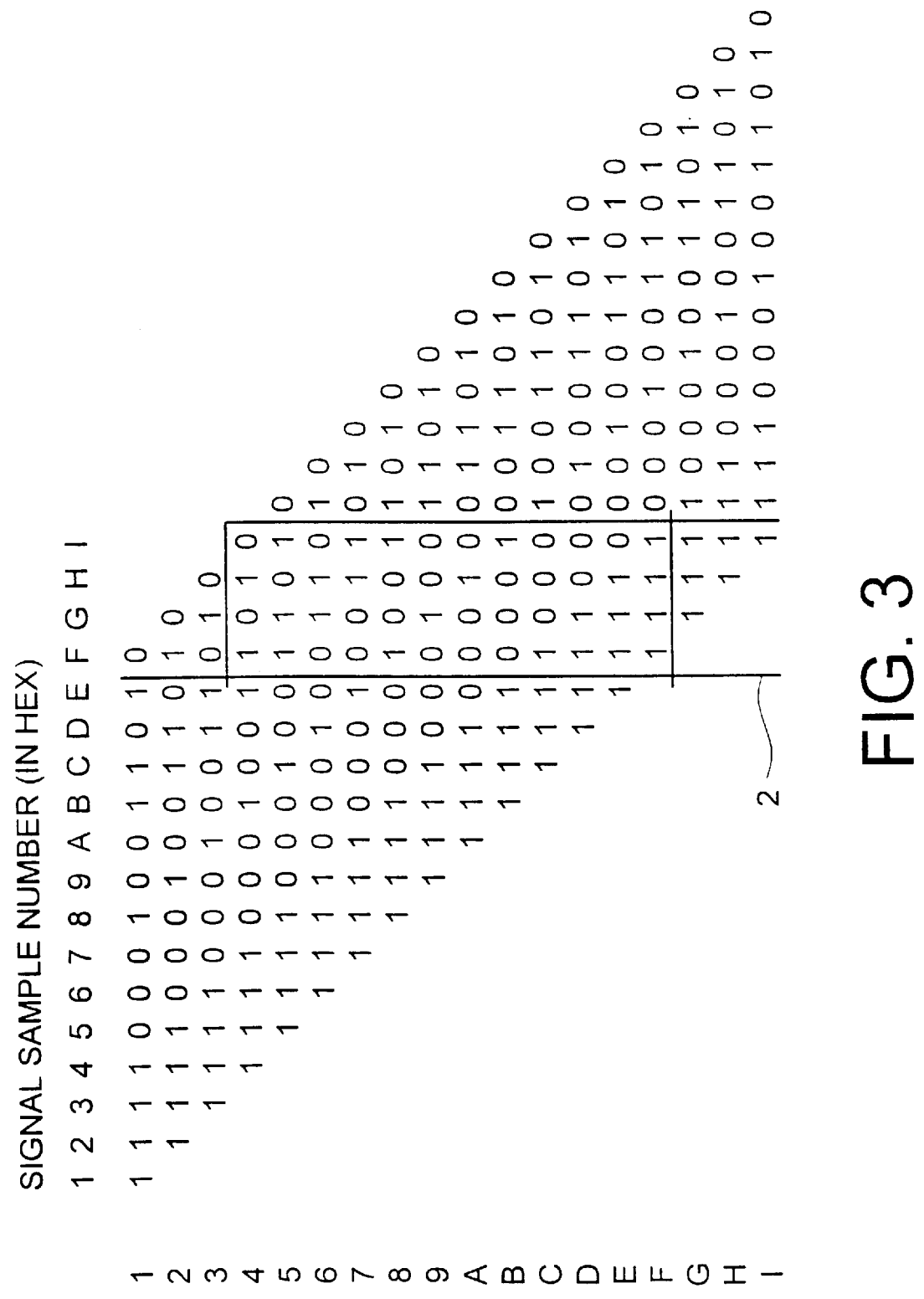

FIG. 3 is a diagram that illustrates an arrangement of overlapping consecutive shifts of a 15-bit code, which can be correlated with received signal samples. Referring to FIG. 3, a plurality of received signal samples are hexadecimally numbered (horizontally) 1 to I. Shown underneath the signal sample numbers are different shifts of a 15-bit codeword with which 15 received samples are to be correlated. The left-most vertical numbering denotes the number of the correlation performed. For example, correlation number 1 shall correlate the codeword in row number 1 with signal samples numbered 1,2,3 . . . to F.

FIG. 3 illustrates an arrangement just before sample number F is received. The samples not yet received are highlighted with bold print and positioned to the right of samples already received. A dividing line 2 is shown between bits of codewords yet to be correlated with sample values not yet received, as compared with bits to the left of the dividing line, which have already been correlated with received samples. Memory elements 1 to E contain partial results compared to the uncompleted correlations with rows 1 to E, respectively. FIG. 3 shows that sample number F has to be received before correlation number 1 can be completed. The receipt of sample numbers F,G,H,I will allow the completion of correlations numbers 1,2,3 and 4, and will allow the correlation with rows F,G,H and I to at least get started. The already started correlations numbers 5 to E can be continued four more positions to the right after sample numbers F,G,H and I are received, by accumulating different combinations of the four new samples with the partial correlations contained in memory elements 5 to E.

Observe that the combination of four new samples S(F), S(G),S(H),S(I), which is required to complete correlation number 4, is −S(F)+S(G)−S(H)+S(I) The signs of this combination correspond to the four remaining bits 1010 in row 4. A "1" signifies a minus sign, while "0" signifies a plus sign. Other combinations that use other sign patterns are required to continue accumulating correlations for rows 5 to E, with a total of 11 combinations being needed for row 4 and rows 5 to E.

A method is used to compute all possible sign combinations of S(F),S(G),S(H) and S(I), a total of 16 combinations, even if less than 16 combinations are needed, because an efficient method can be used for computing all 16 combinations in Greycode order. Moreover, a combination with signs as indicated by the bit pattern 1100 is just the negative of the combination with signs indicated by 0011. Consequently, only half of the 16 combinations need to be formed, and the other half are the negatives of the formed half. As such, the eight combinations to be computed can be formed using only one addition or subtraction for each new value after the first value is formed, if the eight combinations are computed in Grey-code ordering of the sign pattern. In this ordering, only one sign change occurs between successive patterns, as explained below.

For example, starting with the pattern 0000, which requires the sum of the four new values (counted as four operations), the Grey-code ordered computation for the combination, C, proceeds as follows:

| 0000 | S(F)+S(G)+S(H)+S(I) = | C(0) | |
|------|----------------------|------|------|
| 0001 | S(F)+S(G)+S(H)−S(I) = | C(1)= | C(0)−2S(I) |
| 0011 | S(F)+S(G)−S(H)−S(I) = | C(3)= | C(1)−2S(H) |
| 0010 | S(F)+S(G)−S(H)+S(I) = | C(2)= | C(3)+2S(I) |
| 0110 | S(F)−S(G)−S(H)+S(I) = | C(6)= | C(2)−2S(G) |
| 0111 | S(F)−S(G)−S(H)−S(I) = | C(7)= | C(6)−2S(I) |
| 0101 | S(F)−S(G)+S(H)−S(I) = | C(5)= | C(7)+2S(H) |
| 0100 | S(F)−S(G)+S(H)+S(I) = | C(4)= | C(5)+2S(I) |

This process completes the computation of all eight combinations, using four operations to form the first value, and one operation (the addition or subtraction of two times a received sample from a previous combination) to form subsequent combinations in the above-described Grey-code order. The scaling of a sample value by two is not counted herein as an operation, because the use of binary arithmetic in which a right shift by one position is equivalent to multiplying by two is assumed.

The exemplary embodiment described above may be extended to the forming of all combinations of more than four values. The Grey-code ordering of computations for any number of values is characterized by successive binary codes that differ in only one bit position, as illustrated above.

The combinations above, which were formed using a total of 11 operations, are combined with the stored values representing signal samples 4 to E as follows: C(5) is subtracted from stored value 4 to complete correlation number 4; C(2) is subtracted from stored value 5; C(6) is added to stored value 6; C(3) is added to stored value 7; C(6) is subtracted from stored value 8; C(4) is added to stored value 9; C(2) is added to stored value A; C(1) is added to stored value B; C(7) is added to stored value C; C(3) is subtracted from stored value D; C(1) is subtracted from stored value E; and C(O) is subtracted from stored value F. As demonstrated, this process has taken an additional 12 operations.

Next, the signal sample S(F) is subtracted from stored value 1 in order to complete the correlation corresponding to row number 1. Similarly, the signal sample S(F) is added to stored value 2, and the signal sample S(G) is subtracted from stored value 2 to complete correlation number 2. Also, the signal sample combination of −S(F)+S(G)−S(H) is combined with stored value 3 to complete correlation number 3. At this point, this process has taken 1+2+3=6 more operations. However, this number may be reduced by noting that the combination −S(F)+S(G)−S(H)±S(I) was already computed, and removing the contribution ±S(I) requires one operation. Consequently, correlation number 3 can be completed with only two operations instead of three.

Better still, it is possible to start computing combinations in Grey-code order at any point, by starting with forming the following combinations:

−S(F)+S(G);

−S(F)+S(G)−S(H);

and

−S(F)+S(G)−S(H)+S(I).

Observe that the combination of the three values required to complete correlation number 3 is formed at the second step. After the third step, the other combinations are formed in the Grey-code order:

1010 (formed at third step above)
1011

1001
1000
1100
1101
1111
1110 which takes only seven additional operations. At this point, observe that four correlations have been completed for a total effort expended according to the following formulae (where N=4 and M=15 in the above-described example):

(1) $N+(2^{(n-1)}-1)$ to form all 2 N possible sign combinations of N values;

(2) $1+2+3 \ldots (N-1)=0.5N(N-1)$ operations to complete correlation numbers 1 to (N−1); and (3) M−N+1 operations to complete correlation number N and continue M−N other correlations. In addition, correlation numbers G, H and I are initiated by forming combinations of 3, 2 and 1 values (the values of signal samples 1, 2 and 3) and adding them to the storage locations vacated by completed correlations 1, 2 and 3, and thus cyclically re-using the same memory locations. This process also requires 0.5N(N−1) operations.

In adding up all these operations, it is determined that after each reception of N new signal samples, N completed correlations are formed using $$0.5N(N-1)+M-N+1+0.5N(N-1)+N+2^{(N-1)}-1$$

$$M+2^{(n-1)}+N(N-1) \text{ operations,}$$

or $$(M+2^{(N-1)}+N(N-1))/N \text{ operations per correlation.}$$

This process can be reduced slightly by computing the starting and finishing triangular fillets more efficiently by noting that a combination of greater than N/2 values can be formed by subtracting a combination of less than N/2 values from one of the already formed combinations of all N values. Consequently, the computation of the fillets then requires about 0.5N(N−1) operations instead of N(N−1) operations.

The following example illustrates the savings in effort that can be obtained by use of the above-described correlative method. The example illustrates the computation of correlations between all shifts of a received signal and a M=1024-bit codeword. The total number of operations per (1024-point) correlation obtained with different values of new samples N, can be expressed as:

| N = | 4 | 5 | 6 | 7 | 8 | 9 | 10 |
|---|---|---|---|---|---|---|---|
| | 261 | 212 | 181 | 162 | 151 | 151 | 161 |

Observe that a value of N=8 or 9 results in an optimum reduction of the number of operations (about 151 operations) required to perform a 1024-point correlation, which results in a savings of a factor of seven compared to the prior art. Using the method described, it is possible to fabricate 1024-bit correlators having a speed/power/cost trade-off as attractive as prior art 151-bit correlators, thus achieving a longer correlation computation for an equal cost in terms of speed, power or cost. This trade-off translates into higher communications equipment performance.

Furthermore, when numerous shifts of received data samples must be correlated with more than one codeword, additional savings can be realized. The computation of all combinations of N data samples requires, as described above, $2^{(N-1)}+N-1$ operations by performing them in Grey-code order. Then M−N+1 of these combinations are added to a first set of storage locations for correlation with a first codeword, and a second set of storage locations for correlation with a second codeword. Calculating the triangular fillets of values that have to be added to initiate and complete N correlations with each codeword requires, as described above, at most N(N−1) operations per codeword, which results in a total effort of $$L(M-N+1)+2^{(N-1)}+N-1+LN(N-1)=LM+L(N-1)^2+2^{(N-1)}+(N-1)$$

operations to complete N correlations with L codewords. Consequently, the total operations per correlation can be expressed as $$(LM+L(N-1)^2+2^{(N-1)}+(N-1))/LN.$$

For example, to correlate a sliding 1024-signal-sample segment with six different 1024-bit codes requires the following effort:

| N = | 9 | 10 | 11 | 12 |
|---|---|---|---|---|
| | 126 | 120 | 118 | 125 | which illustrates that N=11 would be the most efficient choice.

The above-described methods can be used successfully for any arbitrary codewords. For correlating with specific codewords, even more efficient correlators may be devised in accordance with the above-described principles. For example, consider that when N is selected to be greater than $\log_2(M)$, more combinations of N signal sample values are calculated than needed. However, they are calculated in efficient Grey-code order requiring only one operation per signal sample value. Although it would be desirable to compute only the combinations required, by omitting the computation of certain combinations, it is no longer certain that all of the required combinations can be reached with only one extra operation per combination. In effect, omitting the calculation of certain combinations creates disjointed and separate groups of combinations. Consequently, it is necessary in each case to examine the disposition of each member of the set of required combinations to determine how many operations are required to reach it from another member. The number of operations is equal to the Hamming distance between the corresponding bit pattern that describes the signs (plus or minus) that shall be used to combine signal samples. Given the distance structure, which is the set of all Hamming distances from every N-bit sub-code to every other N-bit sub-code in the set to be computed, the optimum order for computing them all for a minimum effort may be determined by using a Viterbi algorithm to test all possible paths. It may turn out for a particular code that the number of operations to compute the needed combinations of N signal samples is less than the value $2^{(N-1)}+N-1$, which was assumed for the general case of an arbitrary code. As such, a more efficient correlator can then be fabricated for these particular codes, in accordance with the above-described principles.

Alternatively, a code can be specifically formulated to enable the use of an efficient correlator. For example, such a code can be any M-bit code with the property that all overlapping shifts of N-bits form a contiguous set of adjacent N-bit codes (in the Hamming distance sense), such that signal combinations can be computed using only one operation per additional combination after the first combination. Moreover, half of the codes in the contiguous set should be the complements of the other half making it unnecessary to compute the complementary combinations, since they are the negatives of others.

Figure 4:
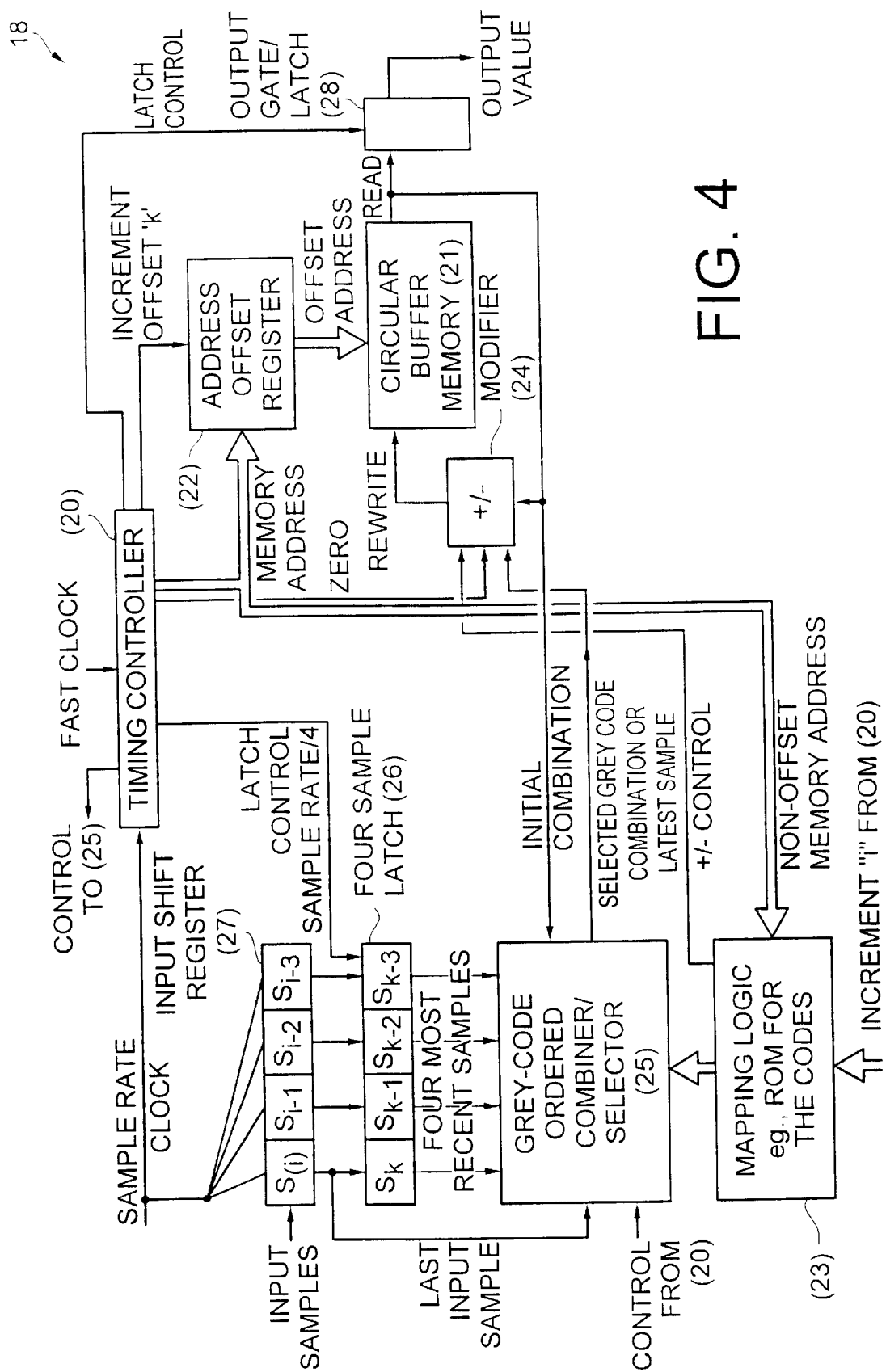
FIG. 4 is a schematic block diagram of an exemplary correlator.

FIG. 4 is a schematic block diagram of an exemplary correlator 18. The exemplary correlator 18 includes a timing controller 20, which controls the input of new signal samples by generating a signal sample clock. The sequence of operations controlled by timing controller 20 repeats every N sample clock cycles. Every N sample clock cycles, the timing controller 20 controls the inputting of N new sample values (where N=4 in this example) and their additions or subtractions from N locations in a memory 21 using an adder/subtractor (modifier) 24. Each such addition or subtraction comprises a memory read, modify and rewrite cycle such that the value stored in the memory location represents an accumulation of values previously added or subtracted. Whether or not one of the N input samples is added or subtracted depends on one of the first or last N bits of the codeword with which the signal is being correlated. A required sign pattern is generated by mapping logic circuitry 23, which is configured according to the codeword to produce the correct add/subtract commands to modifier 24 at different times under the control of the timing controller 20. The memory 21 is utilized as a circular buffer to hold M partially completed correlations.

The next correlation to be completed is at memory location "k", where the address for "k" is maintained in an address offset register 22. The partial correlation at address "k" will be completed by adding an N-sample combination of N previously input samples maintained in an N-element latch 26. A selector 25 comprises logic that functions to compute and store, in Grey-code order, $2^{(N-1)}$ (i.e., eight, if N=4) combinations of the N previously input samples maintained in latch 26, starting with the N-sample combination previously stored in memory location "k-N". Selector 25 outputs the selected one of these combinations necessary to complete correlation "k", under the control of N−1 selection lines from mapping logic 23. At the same time, mapping logic 23 outputs an add/subtract command to modifier 24, dependent upon whether the combination is to be added or subtracted (i.e., sign inverted or non-inverted before adding).

Next, timing controller 20 outputs the just-completed correlation "k", by enabling an output gate 28 to couple the just-completed correlation "k" value to the output, and substitutes a zero value to be written to memory location "k", thus clearing the memory location "k" to zero. Timing controller 20 then controls selector 25 to select the latest input sample from an input shift register 27 which is to be passed to adder/subtractor 24, and at the same time controls mapping logic circuitry 23 to sequentially select memory locations k, k+1, k+2, . . . k+1−N to be modified by adding or subtracting the new input sample. Mapping logic circuitry 23 also controls the addition or subtraction for each of the N memory locations, according to a pre-stored sign pattern that depends on the codeword bits.

For example, if the first four bits of the codeword are 1101, and the last four bits are 1010, then mapping logic 23 causes a subtraction of a first sample of four new samples input to register 27 (corresponding to the codeword having a "1" (='−') in the first bit position), an addition to location k+1 (corresponding to the last codeword bit being a "0" (='+')), subtraction from location k+2 (corresponding to the second-to-last codeword bit being a "1"), and an addition to location k+3 (corresponding to the third-to-last codeword bit being a "0"). When the second sample of the next four samples is input to register 27, mapping logic 23 will generate a "−" sign for memory location "k" (corresponding to the second bit of the codeword being a "1"), a "−" sign for location k+1 (corresponding to the first codeword bit being a "1"), a "+" sign for location k+2 (corresponding to the last bit of the codeword being "0"), and a "−" sign for location k+3 (corresponding to the second-to-last bit of the codeword being a "1"), and so on. The following diagram can assist with understanding the above-described pattern:

| | |
|---|---|
| k | 11<u>0</u>1 |
| k+1 | 01<u>1</u>0 |
| k+2 | 10<u>1</u>1 |
| k+3 | 010<u>1</u> |

The above-underlined bits are the first bits of the codeword that determine the signs of samples for initializing new correlations, which will be formed in the same memory locations vacated by correlations completed by using the non underlined bits as signs (the last bits of the codeword to be correlated). The correlation memory location is cleared to zero between using the last non-underlined bit to complete a correlation and the first underlined bit to start a new correlation in the same location, which is performed as described above by timing controller 20 enabling output gate 28 at the appropriate times.

Interlaced with processing the N new samples to complete N correlations and initialize N new correlations, timing controller controls the addition or subtraction of previous N-sample combinations stored in selector to the other M−N locations of memory 21. This computation may be spread more or less evenly over the N new sample periods, by updating (M−N)/N=M/N−1 locations per sample period. Timing controller 20 provides to mapping logic 23 increments "i" to the base address "k" stored in address register 22, starting with i=N and increasing by one to i=M−1, until M−N locations have been updated. Mapping logic 23 modulo-M adds the increment "i" to the base address "k" to obtain the memory address location to be updated.

The increment "i" provided by timing controller 20 is also used by mapping logic 23 to determine the N-sample combination to be selected by selector 25, and whether the combination shall be inverted or not (by providing a "+" or "−" sign to modifier 24). The index (value of "i") of the combination that shall be combined with the contents of a particular memory location depends on the codeword bits, as can be more readily understood by reviewing FIG. 3 where the value N=4 is used as an example. The bracketed column of four-bit segments indicates the combination to be added to update the partial correlation of each row. If a combination is stored in selector 25 corresponding to the complement of these bit patterns, then the complementary combination is selected at the same time as a minus sign is provided to modifier 24; otherwise the correct combination (if available) is used with a "+" sign.

The mapping of increment "i" to N−1 selection control lines input to selector 25, and a selection of +/− for modifier 24 may be accomplished, for example, by storing M−N, N-bit control signals in a memory area. When the correlation codeword was chosen or changed, then the appropriate values would be loaded into this memory area. Also, the memory area could be extended to contain the N×N sign bits needed to control formation of the starting and ending triangular fillets, which results in a total of M×N bits of memory.

Alternatively, for a fixed correlation code, a Read-Only-Memory (ROM) can be programmed with this information, and in some instances, it can be more efficient to translate the bits of the increment "i" with hard-wired logic, into the N control and selection signals to modifier 24 and selector 25. All of these possibilities, as well as the others described above, are contemplated here.

Figure 5:
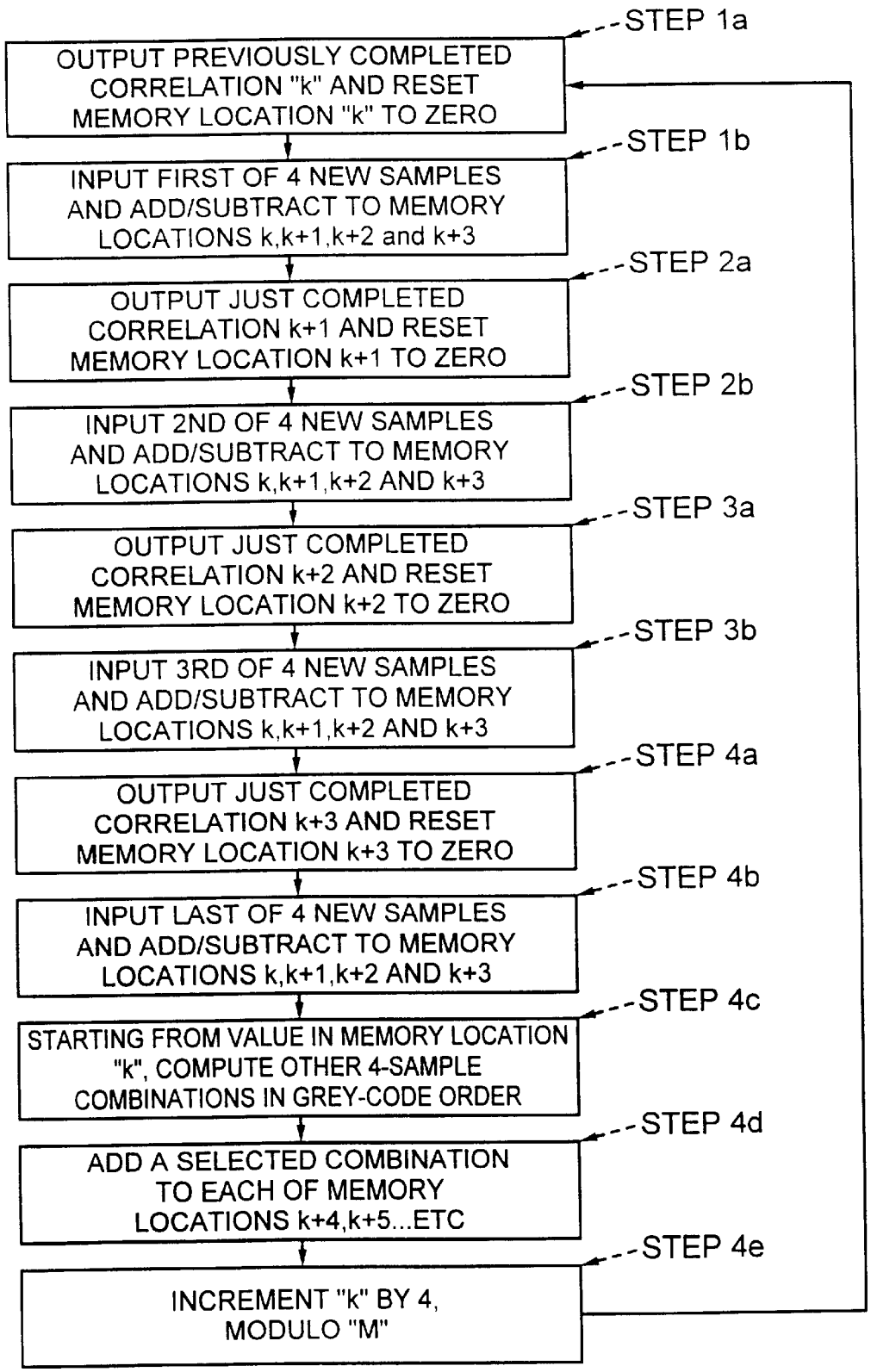
FIG. 5 illustrates a sequence of steps that can by used to implement correlator of FIG. 4.

FIG. 5 now illustrates an exemplary timing sequence of steps for a value of N=4. At step 1a of the sequence, the previously completed correlation at the address "k" is output from the memory location, and that location is zeroed. At step 1b, the first of four new signal samples are input and added to or subtracted from memory addresses k, k+1, k+2 and k+3, as determined by the address offset register 22 which contains the address "k". Whether to add or subtract is determined by the contents of the mapping logic 23.

At step 2a, the completed correlation is output from memory location k+I, and the memory location k+1 is zeroed. At step 2b, the second signal sample is added to or subtracted from memory locations k, k+1, k+2 and k+3.

At step 3a, the completed correlation is output from memory location k+2, and the memory location k+2 is zeroed. At step 3b, the third signal sample is added to or subtracted from memory locations k, k+1, k+2 and k+3.

At step 4a, the completed correlation is output from memory location k+3, and the memory location k+3 is zeroed. At step 4b, the fourth signal sample is added to or subtracted from memory locations k, k+1, k+2 and k+3. At step 4c, starting with the four-sample combination in memory address "k", other $2^{(N-1)}-1$ (i.e., 7 in this case, where N=4) four-sample combinations are computed in Grey-code order. At step 4d, a selected one of the combinations computed in step 4c is added to the contents of each one of the remaining memory locations k+4, k+6 . . . k+M−1. For each such memory location, the combination selected to be added to that location is predetermined for a particular choice of codeword. At step 4e, address k is increased by 4 (modulo-M), and the sequence is repeated from step 1a.

After step 4b has been completed, memory location "k" contains a combination of the four signal values with signs corresponding to the first four bits of the codeword. This combination is used as a starting point for the computation at step 4c of the other seven of the eight total combinations, which together with their respective negatives, comprise the 16 possible sign combinations of the four signal samples. One of these combinations will be needed to complete correlation k+4 by adding it to the contents of memory location k+4. In general, the order in which this value will be computed depends on the code with which the signal is being correlated, and it may be the last value to be computed. Therefore, steps 4a through 4e are required to be completed within one sample clock period, in order to be sure to obtain in time the combination needed to complete correlation k+4 (i.e., the incremented value of k). The correlation so-completed is output at step 1a of the next cycle. Note that steps 4e and 4d may be reversed (i.e., k can be incremented by 4 first at step 4d), but then the address k+4, k+5 . . . k+M−1 must be expressed in terms of the new k value as k, k+1, k+2 . . . k+M−5 for step 4e.

The accumulation of the four sample combinations computed at step 4c to the other M−5 memory locations, k+5, k+6, . . . , M−1, 0, 1, . . . , k−1, has to take place during the next execution cycle of steps 1 through 4. Consequently, in total, selected ones of the computed combinations have to be added to the contents of M−4 memory locations, including memory location k+4, during execution of step 4d and step 4c of the next cycle. By itself, step 4c requires seven operations to be completed in less than one sample clock period, but these operations can be executed in parallel with the four operations of step 4b. The other M−4 operations have to be completed during the remainder of the fourth sample period plus the other three operations, which is a total of M−4+7 operations that have to be accomplished within four sample clock periods. This can be accomplished by providing a computational speed of at least (M+3)/4 operations per sample clock period.

For example, if M=64, a computational speed of at least 17 operations per sample clock period will be needed in addition to the parallel execution of steps 1 through 4d. Each of steps 1–4d consumes an additional four arithmetic operations per sample clock period, so all of the operations can be accommodated if timing controller 20 has available a high-speed clock of at least 21 times the sample clock frequency, which allows 21 read-modify-rewrite cycles to memory 21 per sample clock period. Notably, this is a factor of three less than a prior art sliding correlator of length 64.

The required high-speed sample clock frequency can be reduced by allowing computations of the seven new four-sample combinations to occur at the same time while the previous seven values are being used. This can occur if two alternative sets of seven memory locations are provided. The seven operations needed to compute the seven new combinations can then occur in parallel with the addition of previous combinations to M−4 memory locations, and the speed of the read-modify-rewrite cycles needed for memory 21 is reduced to 4+(M−4)/4 or 19 cycles per sample clock period for a M=64 correlator. Of course, it is possible to trade-off the provision of more parallel processing for more speed or reduced computation speed per processing element. For example, memory 21 can be split into two banks, and two adder/subtractors can be provided so that two read-modify-rewrite cycles can be performed in parallel per high-speed clock period.

The ultimate in parallelism is to split memory 21 into M/N banks of N elements, with each bank being connected to a corresponding one of M/N adder/ subtractors. The four consecutive memory locations to be updated every new sample clock period can be stored in different banks, as can the other (M−N)/N memory locations such that all the required memory read-modify-rewrite cycles can occur in parallel. In order to match such speed, the $2^{(N-1)}$ combinations of N samples needed by selector 25 can be computed in Grey-code order using a chain of $2^{(N-1)}-1$ cascaded adders, whereby an adder adds or subtracts twice a sample value to/from the output of a preceding adder to obtain all combinations in parallel with only the ripple-through delay of the logic. Such an arrangement has only about 1/N the hardware complexity of a prior art, fully parallel correlator that requires M−1 parallel adders.

As such, the method described can be used to form correlators of either longer correlation length, lower hardware complexity, higher speed, lower power consumption, or any combination of these advantages, in comparison with prior art methods. The improved correlator can be employed to correlate all shifts of a set of received signal samples, wherein the set does not have to be a contiguous set of signals but can be received, for example, in bursts (e.g., as in a Time Division Multiple Access (TDMA) system, or "hops" in a frequency hopping system). A need for this method arises, for example, whenever there is uncertainty about the timing of a received signal. Such a need also arises in a Code Division Multiple Access (CDMA) system when a "RAKE" receiver is to be constructed to combine signals received along different delay paths, by despreading different delayed sets of signal samples with a despreading code to form different "RAKE taps". The correlator can be used efficiently to simultaneously despread a large plurality of RAKE taps.

Furthermore, the method can be used to compute correlations between successive shifts of M consecutive signal samples and a signal pattern of M stored sample values which are not restricted to binary values, but can include, for example, ternary values of +1, −1 and 0. All 3**N possible combinations of N signal values can be computed efficiently in a Grey-coded order, wherein only one digit at a time is changed through its allowed set of values, thus enabling a faster correlation algorithm to be devised in accordance with the inventive principles described above.

The method is also useful when correlations must be made with several shifts of a number of different CDMA codes, as in, for example, a navigation receiver for processing CDMA signals received from a plurality (e.g., 4 or more) Global Positioning System (GPS) satellites.

The correlator illustrated in FIG. 4 is less complex and faster than conventional correlators. There are various alternative arrangements that provide similar advantages. An example of one such an arrangement is shown in FIGS. 6a–6c.

Figure 6A:
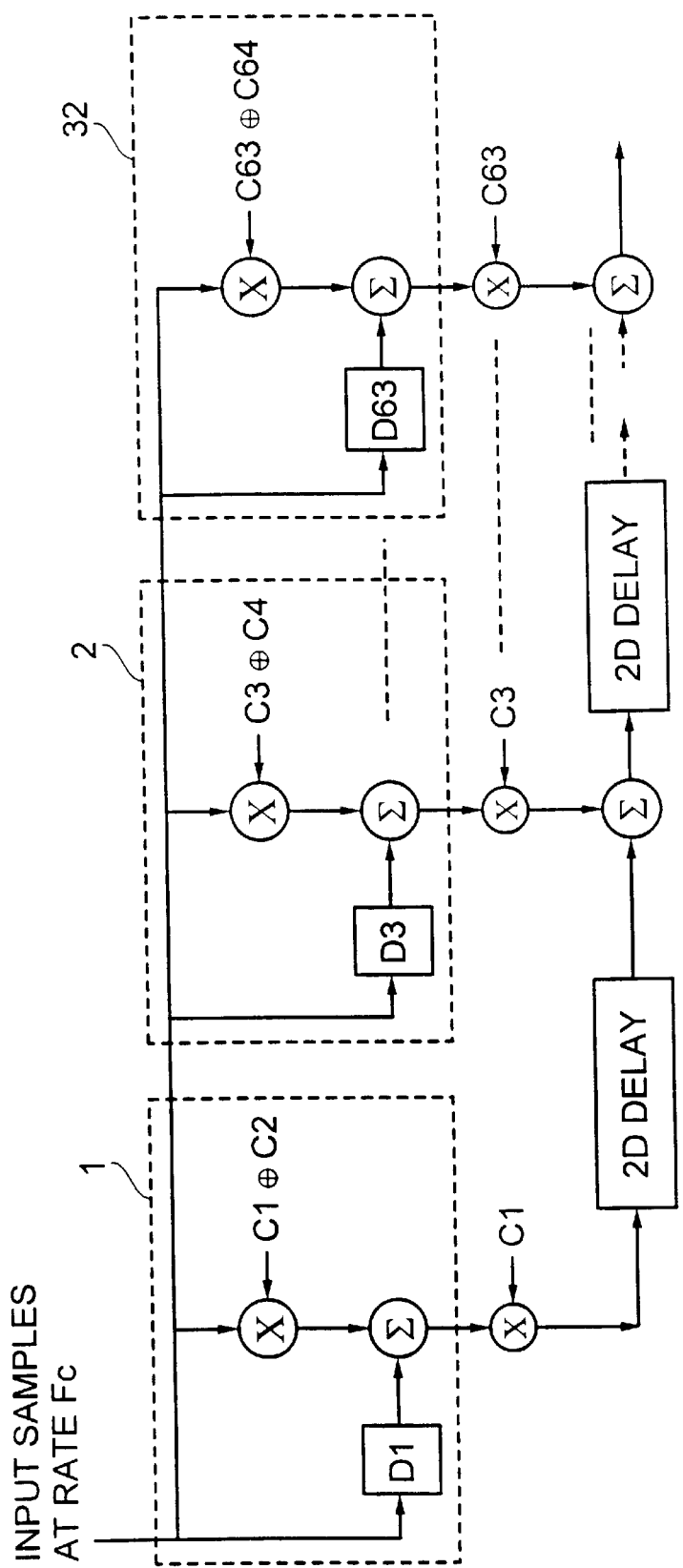
FIGS. 6a–6c and 7–10 illustrate matched filter arrangements according to various first embodiments of the present invention.
Figure 6B:
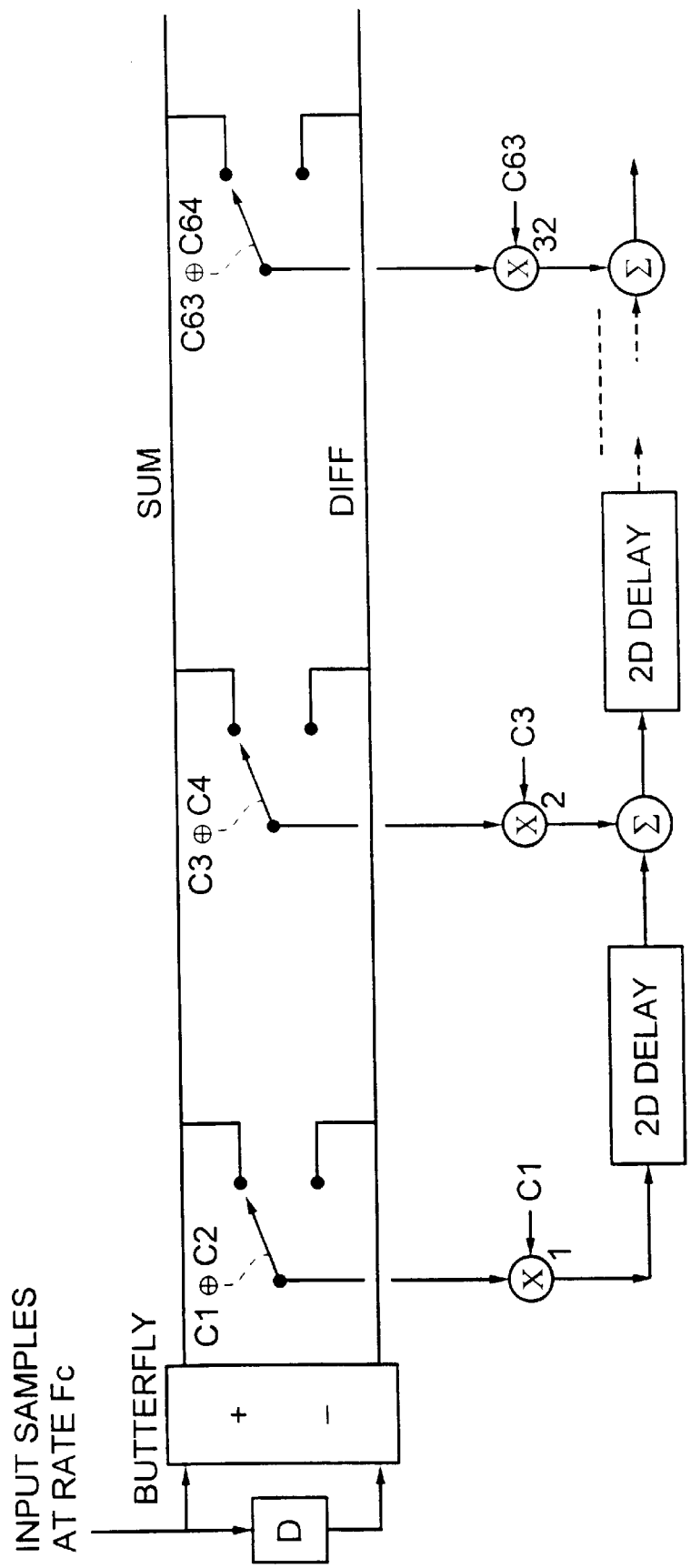
Figure 6C:
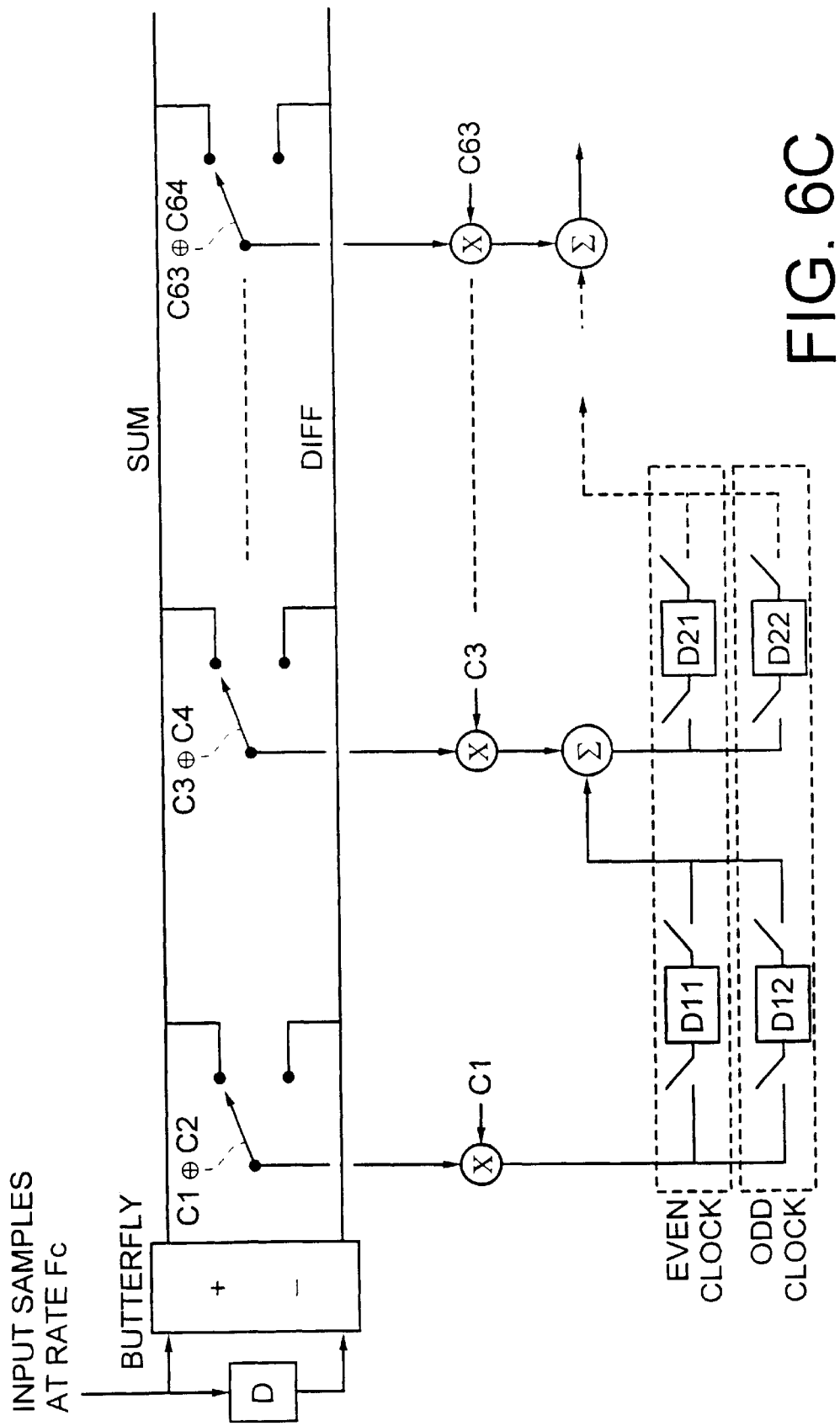

In FIG. 6a, a length 64 matched filter is first replaced by 32 length-2 matched filters, 1, 2, . . . 32. The first matched filter delays input samples in delay element D1 and Adds the delayed output to the next sample multiplied by C1⊕C2, where the operation "⊕" is the same as the operation "exclusive OR" when the coefficient values are one bit binary values of 1 or 0 in Boolean notation (or +1 or −1 in algebraic notation). The multiplication operations by +1 or −1 are thus equivalent to a sign change of the input value (for −1) or not (for +1). Using input signal samples a(i) to a(i+63), the output of the first summer in FIG. 6a is thus:

$$a(i)+(C1\oplus C2)\cdot a(i+1)$$

This is multiplied (sign-changed) again by C1 to obtain $$C1\cdot a(i)+C1^2\cdot C2\cdot a(i+1),$$

which, since $C1^2=1$, is equal to $$C1\cdot a(i)+C2\cdot a(i+1),$$

which equates to a two-sample matched filter output.

This value is then delayed in the first two-sample delay element of FIG. 6a so that, after two sample periods, it is added to the output C3·a(i+2)+C4·a(i+3), of the second two-sample matched filter, thus obtaining:

$$C1\cdot a(i)+C2\cdot a(i+1)+C3\cdot a(i+2)+C4\cdot a(i+3)$$

Figure 2:
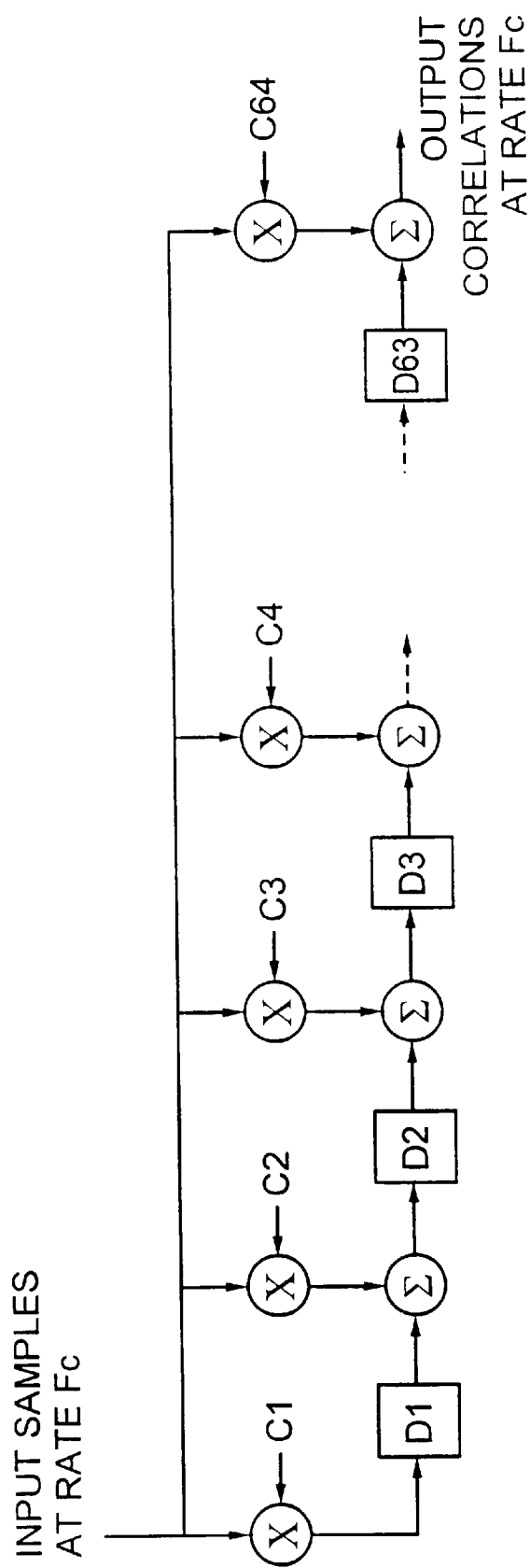
FIG. 2 is another illustration of a conventional correlator.

This will be recognized as the output of a four-sample matched filter. This output may be delayed and added in turn to the output of the third 2-sample matched filter and so forth, until the output corresponding to a 64-element matched filter is obtained. Alternatively, two four-sample matched filter outputs could be combined after delaying one of them by four sample periods to obtain an 8-sample matched filter value, and so forth, forming a binary tree which successively doubles the matched filter length. With any of these variations however, the total number of additions and multiplications (sign changes) is roughly the same as in the conventional device of FIG. 2.

Each of the 32 2-sample matched filters of FIG. 6a computes either the sum or the difference of the last two input samples (or their negatives). Thus, there are only two distinct values, the sum and the difference, which need be formed, not 32 values.

FIG. 6b shows precalculations of a sum and a difference of two successive samples, by delaying a sample in delay D and combining it with a succeeding sample in a Butterfly circuit. The term "Butterfly circuit" is borrowed from the theory of Fast Fourier Transform structures, which also need to compute many simultaneous sums and differences. A simultaneous sum and difference of two multi-bit binary values can be computed using a logic structure of less than twice the complexity of a single add or subtract circuit and only of the order of 40% more than a single add. Thus, the use of Butterfly circuits to form pairs of sample combinations represents about a 40% saving in complexity and power consumption compared to the equivalent number of separate adders and subtractors.

In FIG. 6b, the sum and difference values a(i)+a(i+1) and a(i+1)−a(i) are fed to a number of two way switches or selectors. The first selector selects the sum or difference in dependence on the exclusive OR between C1 and C2. If C1=C2, then a(i) and a(i+1) are multiplied by the same sign in the device of FIG. 6b, thus generating their sum or negative sum. Consequently, the first selector circuit selects the sum if C1=C2, (i.e., C1.XOR.C2=0). Conversely, if C1.XOR.C2=1, the difference is selected. The selected sum or difference is then sign changed by a further multiplication with C1 to obtain the desired value C1·a(i)+C2·a(i+1) from the first stage (2-sample matched filter).

As in FIG. 6a, this value from the first stage is delayed two sample periods in delay element 2D before being added to the second stage output of $X_2$:

$$C3\cdot a(i+2)+C4\cdot a(i+3).$$

Thus, the formation of a 64-stage matched filter output value proceeds as before. However, in this embodiment the number of additions and multiplications (or sign changes) has been reduced from 63–64 to 31 by the precombination of two successive input samples using a Butterfly circuit. This halves the power consumption in the multiply-add operations.

A significant amount of power, however, is consumed by the delay elements. In FIGS. 6a, 6b and 6c, the number of delay elements times their frequency of operation is roughly the same. To halve the total power consumption, the number of delay elements or the clock frequencies of the delay elements should be reduced.

FIG. 6c shows how the 31 2-element delays of FIG. 6b (all 62 elements of which are clocked at the sample rate Fc) may be partitioned into two banks of 31 single-element delays, with each bank clocked at Fc/2. Thus, the power consumption is reduced from 62.Fc units to 2×31.Fc/2 units, that is 31.Fc units, resulting in a halving of the power consumption in the delay elements. Thus, the inventive matched filter of FIG. 6c operates at roughly half the power consumption of the prior art matched filter of FIG. 2.

In the first embodiment, input samples are delayed by one sample using a delay element D such as a digital storage element, register or latch, thus providing access to both the new sample and the previous sample simultaneously. A Butterfly circuit forms the sum and difference of the current and previous value. These two precombinations of two successive input samples are then fed to a number N/2 of selector circuits. The selector circuits select either the sum or the difference according to whether each pair of successive binary bits of a given N-bit word are the same or different. The selected values are then changed in sign according to the first of each pair of bits so that the sign changed value is equal to one of the sum, the difference, the negative sum or the negative difference according to whether the associated pair of binary bits had the values 00,01,10 or 11, respectively. The sign changed, selected values are then fed to N/2 adder circuits and the output of the adder circuits are fed to a respective one of N/2 two-sample-period delay elements. The second input of each adder is derived from the foregoing one of the delay elements, thus forming a chain. The adder at the beginning of the chain may be omitted if no cascading is intended, and the delay element after the final adder may also be omitted. If no cascading is used, the output of the first two sample matched filter goes directly to the first delay element, and the output of the final adder is the final output or correlation value. Thus the number of additions performed at each sample clock period has been reduced to a Butterfly operation (equivalent to two add.'s) plus N/2−1 additions, from the N additions required by the conventional matched filter.

Referring back to FIG. 6c, a further refinement of the first embodiment is shown which replaces each of the N/2−1 two-sample delay elements with two chains of N/2−1 one-sample delay elements. The first chain is selected to be used on even sample periods and the second chain is selected on odd sample periods. This reduces the number of delay elements that have to be clocked at each sample period from N−1 of the prior art to N/2−1. The combination of halving the number of additions and halving the number of delay elements clocked per sample period effectively halves the power consumption of the matched filter.

Figure 7:
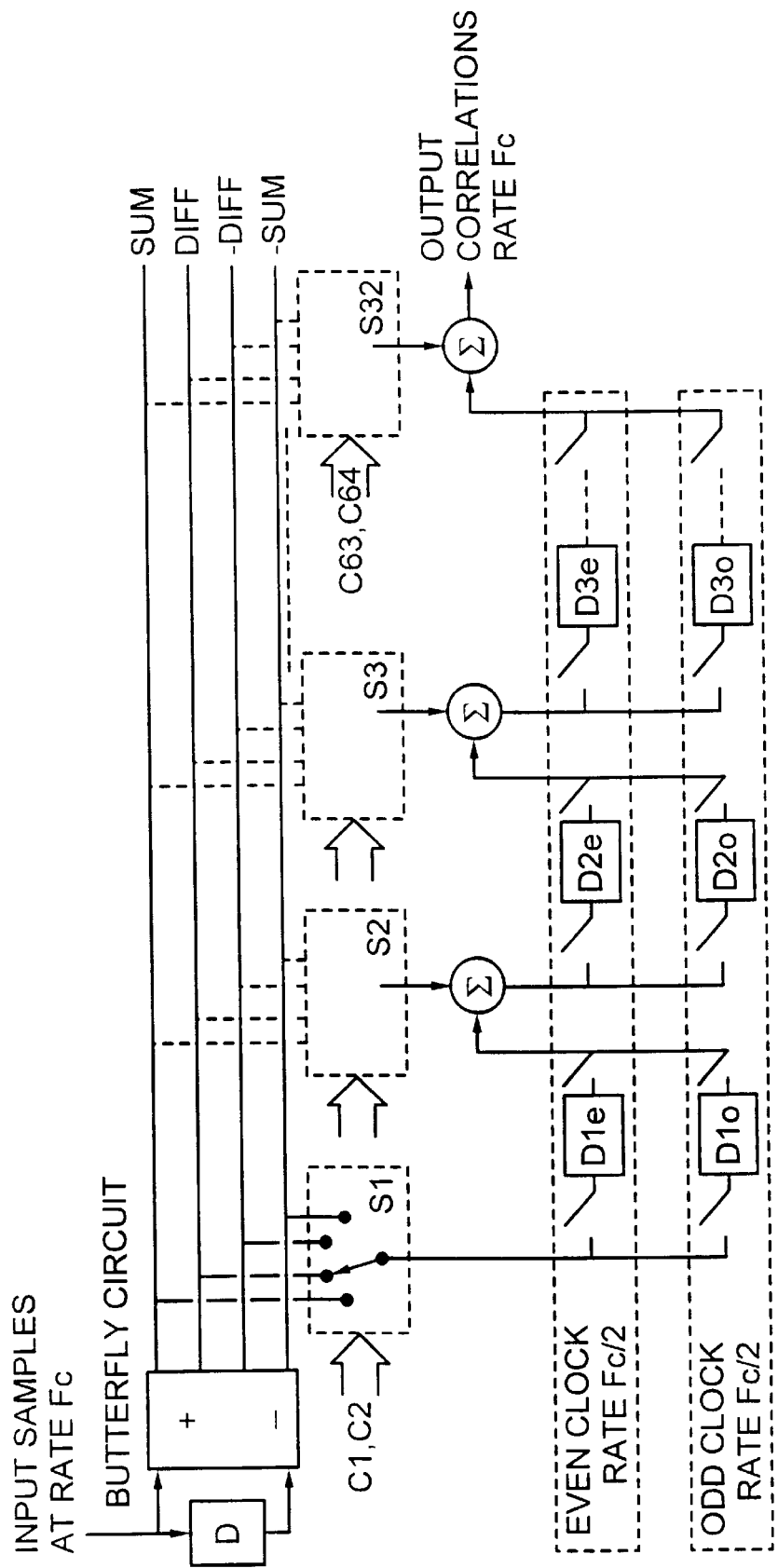
Figure 8:
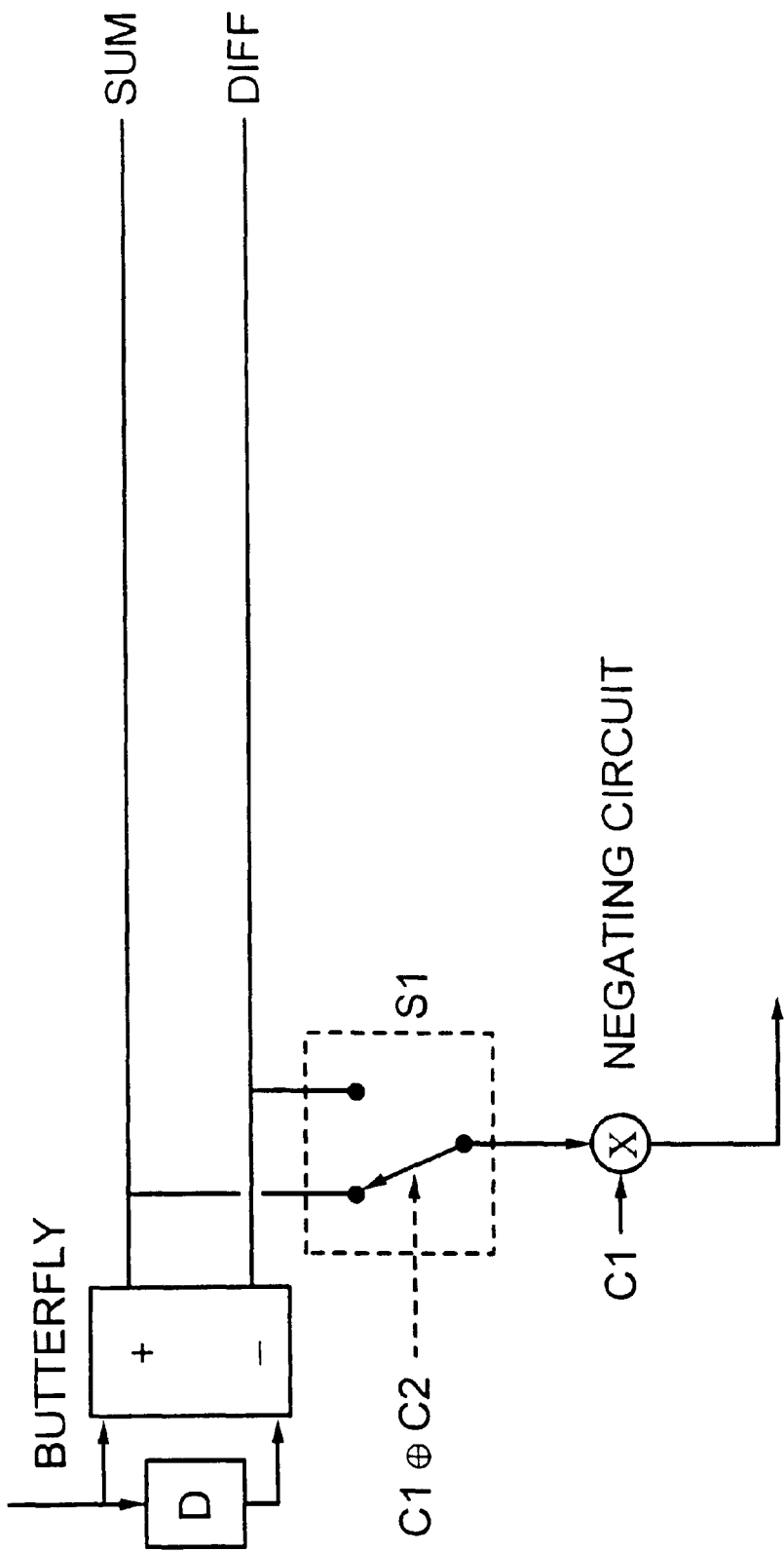

FIG. 7 illustrates a matched filter arrangement according to another embodiment in which a Butterfly circuit is used to form all four of the combinations SUM, DIFFERENCE, −SUM and −DIFFERENCE of two successive input samples. Thirty-two, 4-way selector circuits select one of the four combinations in dependence on pairs of binary coefficients such as (C1,C2), (C3,C4), and so forth. Selected combinations are delayed in a first bank of 31 delay elements D1e to D31e for even sample periods or in a second bank of 31 delay elements D1o to D31o for odd sample periods, with addition of each delayed value to the previously delayed sum. Selector switches S1, S2, . . . S32 select a previously delayed sum from a delay element of the even bank of delays for even sample periods or, alternatively, from an odd-bank delay element for odd sample periods. Forming all four precombinations thus eliminates 32 sign-changes at the expense of replacing 2-way selector switches with 4-way selector switches. This choice may be made after detailed trade-offs using parameters of a particular integrated circuit technology to determine the best realization. This trade-off is more particularly illustrated by FIG. 8, which shows an alternative to forming four combinations and using 4-way selector switches by forming only two precombinations, using 2-way selector switches, but imposing the need for a post-selection sign-changer according to the value of C1.

Figure 9:
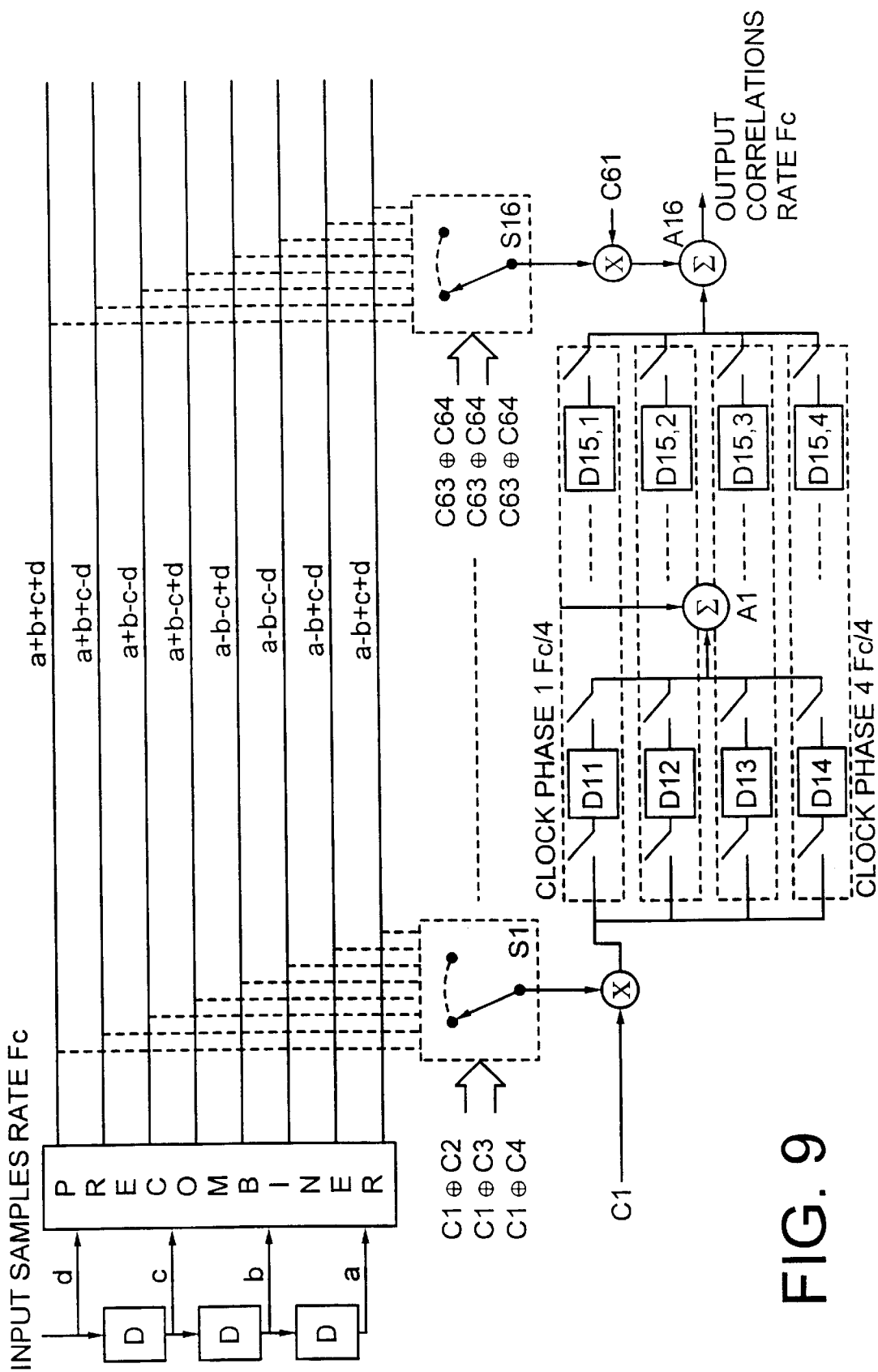

FIG. 9 shows a further extension of the invention by forming precombinations of four signal samples. Using three delay circuits D, four successive sample values a, b, c and d, are presented to the precombiner. The number of possible precombination sign patterns is now two-to-the-power-four, or 16. Since it is beneficial to avoid forming combinations that merely differ in sign, the precombiner only forms the eight combinations having a '+' sign for sample value 'a'. It is therefore a saving in hardware that the 16 selector switches need only be 8-way switches instead of 16-way switches. The 8-way switches select one of the eight precombinations according to groups of three binary bits such as:

B1=C1.XOR.C2

B2=C1.XOR.C3

B3=C1.XOR.C4

By XORing C1, the sign to be applied to sample value 'a' is ignored. This overall sign is applied post-selection in the multiplier (sign-changer) using C1.

The output of the first sign changer equates to a four-sample matched filter value which is now delayed four sample periods in one of the four banks of 15 delay elements. Each delay element is driven by clock frequency Fc/4, and each bank is used on every fourth clock pulse of the clock Fc. The clock Fc is thus divided by four to produce four, quarter-frequency clocks of staggered timing phase to clock the four delay-element banks respectively. It may be seen that, in FIG. 9, a 64-sample matched filter is formed using only 15 delay and add stages, and that the power consumption in the delay elements is reduced from 63.Fc as in the device of FIG. 2 to 4×15.Fc/4, that is 15.Fc. Thus the power consumption has been roughly reduced to one quarter that of the device shown in FIG. 2.

The above principles may be extended to computing more precombinations of input samples than just the sum and difference of two successive values, as further explained in the parent application. For example, in FIG. 9, input samples may be fed through a chain of three delay elements to provide parallel access to four successive samples, i.e. the current sample plus the last three. A precombiner computes all sixteen possible additive combinations of the four input samples using all possible four-bit sign patterns. According to an exemplary embodiment, only eight of these need be computed as the other eight are simply the negatives of these. Also the eight combinations are computed in a Grey code ordered structure in which only one sign changes between each successive precombination formed, thus reducing the number of additions from 8×3=24 to 3+7=10. Other techniques may be used to reduce the complexity of forming precombinations, such as exploiting the use of Butterfly circuits which can form a sum and a difference simultaneously with less complexity than two Additions.

Selector circuits, S1–S16, then each select one of the sixteen precombinations according to the polarities of four binary bits of the given N-bit word. This can comprise selecting one of eight precombinations and then negating it, as shown in FIG. 9. The selected precombination is then fed through an adder circuit to a four-sample delay element. The number of selector circuits has now been reduced to N/4, the number of adder circuits reduced to being N/4−1 and the number of 4-sample delay elements used is N/4−1. The N/4−1 4-sample delay elements can be replaced by four chains of N/4−1 one-sample delay elements, each clocked with a different one of four phases of a ¼-sample-rate clock, also shown in FIG. 9. Thus, the number of delay stages clocked and the number of additions performed at each sample clock period are reduced to approximately N/4, resulting in a corresponding three quarter reduction in power consumption.

Extending the above principle to forming more than 16 precombinations using more than four successive input samples reduces the power consumption of the correlator only to a certain point, after which the formation and distribution of the greater number of precombinations to the selector circuits can cause the power consumption to rise once more. This is due to the number of word lines carrying the precombinations rising exponentially fast, i.e. as two-to-the-power of the number of input samples combined, while the number of shifts and additions only reduces proportionally. Thus, there is a need for a design that minimizes the power consumption for any given value of correlation length N.

Figure 10:
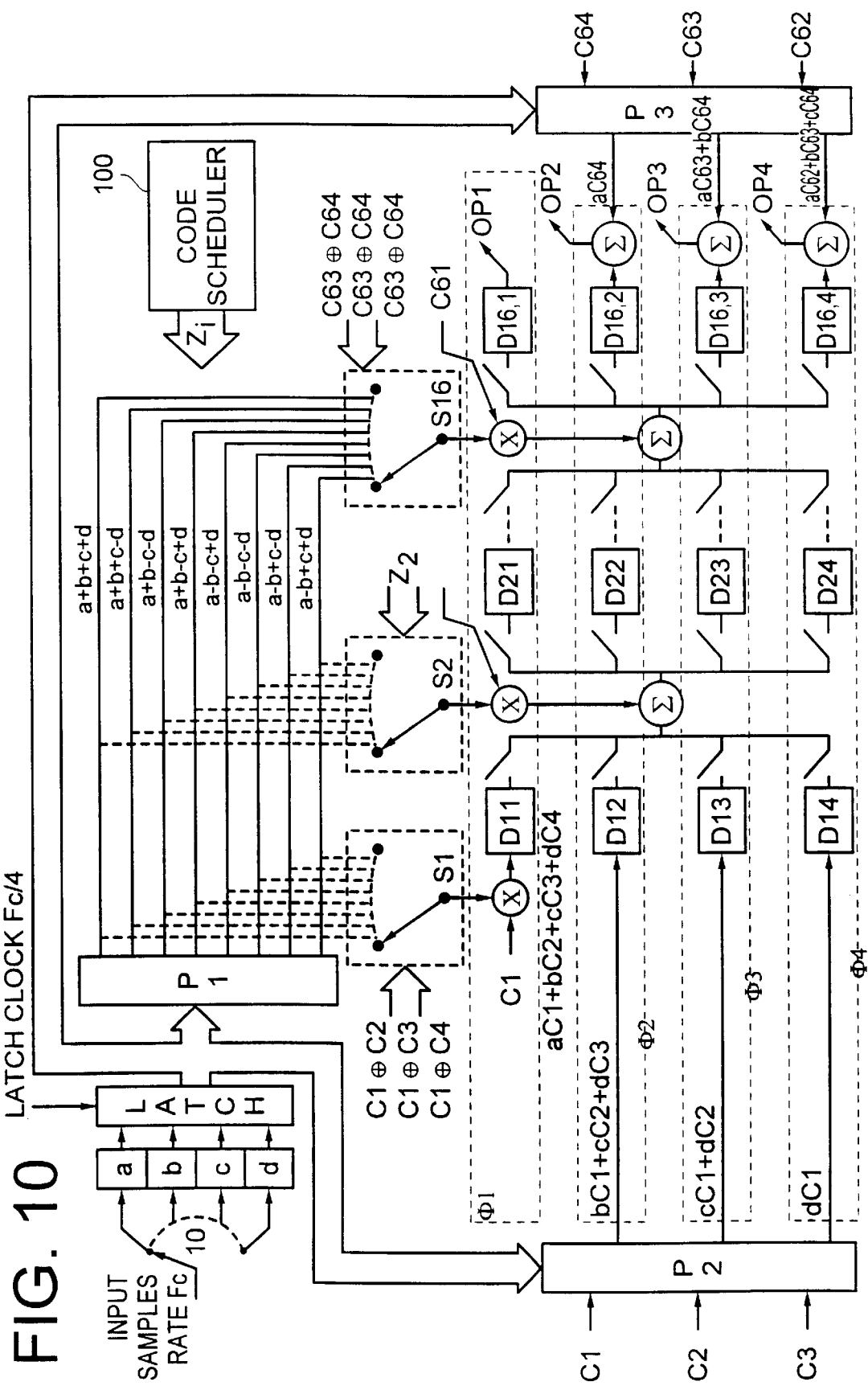

In another embodiment, illustrated in FIG. 10, the power consumption can be further improved by forming precombinations not upon inputting every new sample, but only upon inputting every group of, for example four new samples. Thus, the formation rate of precombinations is reduced, as is the rate of toggling of the precombinations' word lines. In this embodiment, N/4 four-sample precombinations are added, in block Φ1, to form a first N-sample correlation value. Then N/4−1 precombinations are added, in block Φ2, to a three-sample combination of earlier input values and a current sample to form a second correlation value. Another N/4−1 precombinations are combined, in block Φ3, with a two-sample combination of earlier input values and a combination of the current and previous sample to form a third correlation. Finally, a further N/4−1 precombinations are selected and combined, in block Φ4, with an earlier input sample value and a combination of the three most recent input sample values to form a fourth correlation. In this way, four correlations are generated per four sample clock periods by means of approximately N/4 add-shift operations per correlation value, and the rate of formation of the precombinations is reduced to once per four sample clock periods.

The reduction in power consumption may be frustrated by the exponentially increasing number of precombinations to be formed, and by the increasing complexity of the selector switch, and so on. Thus there is optimum number of precombinations to form which results in minimum power consumption.

A difference in the matched filter of FIG. 9 and the sliding correlator of FIG. 4 is that, in FIG. 9, eight precombinations are formed at each cycle of the clock Fc, while in FIG. 4, precombinations of four samples are computed only every fourth sample clock. One reason is because in FIG. 4 complete groups of four correlations are computed by adding a triangular fillet of one odd sample, the sum of two samples and the sum of three samples at the beginning and end of the second, third and fourth correlation of each group of four correlations, respectively.

FIG. 10 shows how, the sliding correlator of FIG. 4 can be implemented according to an alternative embodiment. Input samples arriving at rate Fc are distributed by a four-way commutator 10 to four memory elements denoted by a, b, c, d. Effectively, this forms a serial to 4-sample parallel convertor such that input samples are grouped into fours and latched to the input of precombiner P1 every fourth sample clock. The four samples from the input latch are combined in precombiner P1 at the reduced rate of Fc/4, accordingly the values of the 8 output lines change only at the rate Fc/4. This reduces the power consumption in the precombiner P1. The first selector switch denoted by S1 selects one of the precombinations in dependence on C1×C2, C1×C3 and C1×C4 as before and then the selection is sign changed according to the overall sign C1 to obtain aC1+bC2+cC3+dC4 which is a four-sample matched filter value for clock phase 1.

For clock phase 2, precombiner P2 forms bC1+cC2+dC3; for clock phase 3, precombiner P1 forms cC1+dC2; and for clock phase 4, precombiner P1 forms dC1.

The value formed for each clock phase is delayed in a respective one of four delay-element banks, the first elements of which are denoted by D11, D12, D13 and D14.

The delayed output from the first delay bank elements D11, D12, D13, and D14 are added to another precombination selected by selector S2. In contrast with FIG. 9 however, S2 selects a different set of samples, eC5+fC6+gC7+hC8, for the first clock phase, where e, f, g, h are the four input samples after a, b, c, d. After addition, the following 8-sample matched filter value is obtained:

$$aC1+bC2+cC3+dC4+eC5+fC6+gC7+hC8.$$

For the second clock phase, selector S2 must select:

$$eC6+fC7+gC8+hC9$$

in order to add with:

$$bC1+cC2+dC3$$

from P2, to obtain the 7-sample matched filter value:

$$bC1+cC2+dC3+eC6+fC7+gC8+hC9$$

and so on. The bit-combinations used to control selector switch S2 are denoted by $Z_i$, where i=2 to 16. Code Scheduler 100 precomputes and stores the groups of three selector switch control bits.

Further in FIG. 10, the function of S16 is to select the final four-sample combination required to complete a 64-sample correlation on the first clock phase. A different combination is selected for the second clock phase, which corresponds to the penultimate four sample values of a second correlation, the final value aC64 being provided by third precombiner P3. Likewise, P3 provides combinations aC63+bC64 to complete a correlation at the third Fc/4 clock phase and aC62+bC63+cC64 to complete a fourth correlation. Thus, four correlations are completed in one Fc/4 clock period. This is achieved by only 16 delay and 16 add operations per correlation. The only additional operations are the precombination operations performed by P1, P2 and P3 every fourth clock cycle of the sample rate clock Fc. The total number of precombinations formed is thus 8(P1)+3(P2)+3(P3)=14 per four cycles of clock Fc, that is 3.5 combinations per computed correlation in addition to the 16 delay and add operations. The power cost of forming precombinations is thus reduced compared to the scheme of FIG. 9.

The principle may of course be extended to further reduce the power cost of forming precombinations by forming them in Grey-coded order, and may be applied to precombining more than four input samples at a time. In addition, correlating may be performed with more than one 64-bit binary code at once, by duplicating the select-delay-add elements, but without the need to duplicate the precombining circuit P1. The optimum number of samples to precombine, using either the scheme without the triangular start and end fillet of FIG. 9, or the scheme of FIG. 10 to implement the start and end fillets, will be greater when simultaneous correlation with more than one code is used, due to the common precombining effort becoming less significant in the total power budget.

The invention can also be applied to correlating a stream of complex samples having both a real and an imaginary part with a complex code having a real sign and an imaginary sign. Such a correlator may be structured according to a commonly assigned U.S. patent application Ser. No. 08/748,755 to Bottomley et al., which is hereby incorporated by reference herein.

It may also be realized that correlations with sample shifts that are not required to be formed in a given application may be omitted by suitably inhibiting the clock pulses to different parts of the circuit and delay elements in accordance with the correlations to be omitted. Thus, power consumption may be further reduced when not all sliding correlations need be computed.

It will be appreciated by those of ordinary skill in the art that this invention can be embodied in other specific forms without departing from its essential character. The embodiments described above should therefor be considered in all respects to be illustrative and not restrictive.

We claim:

1. A matched filter for forming correlations between a stream of signal samples presented at a rate determined by a sample rate clock and a given binary code having a plurality of binary bits, comprising:

precombining means for forming precombinations of groups of input samples;

a plurality of selection means each controlled by a group of the binary bits to select one of the precombinations in dependence thereon;

addition means for combining the selected precombinations with a delayed sum to obtain an undelayed sum; and delay means for delaying undelayed sums to produce the delayed sums.

2. The matched filter of claim 1, wherein the delay means is divided into a number of banks of delay elements, each bank being clocked with a respective phase of a multiphase clock derived by dividing the frequency of the sample rate clock by the number of banks.

3. The matched filter of claim 2, wherein the number of banks is equal to the number of samples in the groups of input samples.

4. The matched filter of claim 1, wherein the number of said precombinations formed is equal to two to the power of the number of samples in the groups of input samples.

5. The matched filter of claim 1, wherein the number of said precombinations formed is equal to two to the power of the number of samples in the groups of input samples divided by two.

6. A method for forming correlations between a stream of signal samples presented at a rate determined by a sample rate clock and a given binary code having a plurality of binary bits, comprising the steps of:

precombining groups of input samples to form precombinations of the groups of input samples;

selecting a plurality of the precombinations, the selecting controlled by a group of the binary bits;

adding the selected precombinations with delayed partial sums to obtain undelayed partial sums; and delaying the undelayed partial sums to produce the delayed partial sums.

7. The method of claim 6, wherein the delaying step is performed by a number of banks of delay elements, each bank being clocked with a respective phase of a multiphase clock derived by dividing the frequency of the sample rate clock by the number of banks.

8. The method of claim 7, wherein the number of banks of delay elements is equal to the number of samples in the groups of input samples.

9. The method of claim 6, wherein the number of said precombinations formed is equal to two to the power of the number of samples in the groups of input samples.

10. The method of claim 6, wherein the number of said precombinations formed is equal to two to the power of the number of samples in the groups of input samples divided by two.

11. A method of producing correlations between successive shifts of a numerical sample sequence and at least one given binary code containing a plurality of binary bits, comprising the steps of:

forming a number of precombinations of successive ones of the numerical samples, the number of precombinations formed being less than a number of samples in the numerical sample sequence;

applying different patterns of sign inversions to selected precombinations; and delaying and adding selected precombinations to produce the correlations.

12. The method of claim 11, wherein the precombinations are formed in a Grey-coded order of the corresponding different sign patterns.

13. The method of claim 11, wherein at least one of the sign inversions in the patterns of sign inversions are based on at least one of the plurality of binary bits.

14. The method of claim 11, wherein the step of delaying and adding comprises:

delaying the selected precombinations in a number of banks of delay elements, each bank being clocked with a respective phase of a multiphase clock derived by dividing the frequency of the sample rate clock by the number of banks.

15. An apparatus for producing correlations between successive shifts of a numerical sample sequence and at least one given binary code containing a plurality of binary bits, comprising:

a first circuit for forming a number of precombinations of successive ones of the numerical samples, the number of precombinations formed being less than a number of samples in the numerical sample sequence;

a second circuit for applying different patterns of sign inversions to selected precombinations; and delaying means and adding means for delaying and adding selected precombinations to produce the correlations.

16. The apparatus of claim 15, wherein the precombinations are formed in a Grey-coded order of the corresponding different patterns of sign inversions.

17. The apparatus of claim 15, wherein at least one of the sign inversions in the patterns of sign inversions are based on at least one of the plurality of binary bits.

18. The apparatus of claim 15, wherein the delaying means comprises:

at least one bank of delay elements for delaying the selected precombinations, each bank being clocked with a respective phase of a multiphase clock derived by dividing the frequency of the sample rate clock by the number of banks of delay elements.

* * * * *